L. KING.
Lightning Rod.

No. 113,530. Patented Apr. 11, 1871.

United States Patent Office.

LEWIS KING, OF EAST CLEVELAND, OHIO.

Letters Patent No. 113,530, dated April 11, 1871.

IMPROVEMENT IN LIGHTNING-RODS.

The Schedule referred to in these Letters Patent and making part of the same.

*To all whom it may concern:*

Be it known that I, LEWIS KING, of East Cleveland, in the county of Cuyahoga and State of Ohio, have invented certain new and useful Improvements in Lightning-Rods, of which the following is a description, reference being had to the accompanying drawing making part of this specification.

Figure 1:
Figure 2:
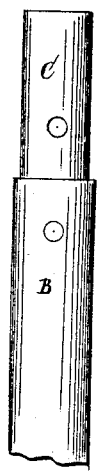
Figure 3:

Figure 1 is a view of a section of rod and joint.
Figure 2 is a view of a section of rod disjointed.
Figure 3 is a vertical transverse section.

Like letters of reference refer to like parts in the different views.

This invention has for its object the coupling together in an easy, cheap, and durable manner the several sections of a tubular lightning-rod, and so that the continuity of the rod shall not be interrupted in the least by the joints, as hereinafter more fully set forth and described.

In the drawing, fig. 1—

A B represent two sections of a tubular rod, connected to each other by means of a tubular dowel, C, fig. 2, which, however, may be of solid metal, if so desired. Said dowel is made to fit closely within the two ends of the rod, as shown in fig. 3.

The ends of the rod thus slid on over the dowel are made to abut upon each other by the pins D, inserted transversely through the rod and dowel as shown. The pin-holes being draw-bored, the pins draw the two ends tightly upon each other, securing the ends of the rod and dowel firmly together, forming a strong and durable connection without any enlargement of the rod about the joint, as shown in fig. 1.

One end of the dowel may project from the rod, making an integral part of it; or they may be connected at one end otherwise than by the pin D, in which case one pin only would be used to connect the other or loose ends of the dowel and tube.

This manner of connecting the several lengths of rod possesses the especial advantage of being easily and quickly made, and which can be as easily and readily taken apart by simply driving out one of the pins, thereby allowing the dowel to slip from the rod.

This connection can be made at places where the rod may curve, in consequence of the angle of the building, from a direct course, and when the rod will not admit of being turned for the screw-coupling in ordinary use.

I am aware that dowels have been used for connecting tubular rods, but this broadly I do not claim. Such dowels have been secured to the rods by dents made in the rod and the swell of the dent forced into the dowel. Such joints cannot be taken apart, as the dents prevent the rod from slipping from off the dowel; hence, to disconnect the rod it must be cut off, thereby spoiling the joint and losing a part of the rod. This, however, is not the case with my joint, as it can be taken apart with but little trouble and without loss of any of the rod.

Claim.

What I claim as my improvement, and desire to secure by Letters Patent, is—

The herein-described joint, when arranged in the manner as described, with a dowel, C, and one or more pins, D, substantially as specified, for the purpose set forth.

LEWIS KING.

Witnesses:
W. H. BURRIDGE,
J. H. BURRIDGE.